US012314678B2

(12) United States Patent
Asai et al.

(10) Patent No.: US 12,314,678 B2
(45) Date of Patent: May 27, 2025

(54) INTERACTION ASSISTANCE DEVICE

(71) Applicant: NTT DOCOMO, INC., Chiyoda-ku (JP)

(72) Inventors: Hiroki Asai, Chiyoda-ku (JP); Hisashi Kurasawa, Chiyoda-ku (JP); Yoshinori Isoda, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 458 days.

(21) Appl. No.: 17/775,533

(22) PCT Filed: Oct. 27, 2020

(86) PCT No.: PCT/JP2020/040242
§ 371 (c)(1),
(2) Date: May 9, 2022

(87) PCT Pub. No.: WO2021/111767
PCT Pub. Date: Jun. 10, 2021

(65) Prior Publication Data
US 2022/0399021 A1    Dec. 15, 2022

(30) Foreign Application Priority Data
Dec. 4, 2019    (JP) .................................. 2019-219441

(51) Int. Cl.
*G06F 40/56*    (2020.01)
*G10L 15/22*    (2006.01)

(52) U.S. Cl.
CPC .............. *G06F 40/56* (2020.01); *G10L 15/22* (2013.01); *G10L 2015/223* (2013.01)

(58) Field of Classification Search
None
See application file for complete search history.

(56) References Cited

U.S. PATENT DOCUMENTS 10,909,983 B1 * 2/2021 Peng ..................... G06F 18/254

FOREIGN PATENT DOCUMENTS

JP    2014-134675 A    7/2014

OTHER PUBLICATIONS

English translation of International Preliminary Report on Patentability and Written Opinion issued Jun. 16, 2022 in PCT/JP2020/040242, 5 pages.
International Search Report issued Dec. 1, 2020 in PCT/JP2020/040242, filed on Oct. 27, 2020, 2 pages.

* cited by examiner

*Primary Examiner* — Antim G Shah
(74) *Attorney, Agent, or Firm* — Oblon, McClelland, Maier & Neustadt, L.L.P.

(57) ABSTRACT

An interaction assistance device 10 is configured to: calculate a first use degree representing a degree to which a function is used in accordance with the user speech in a first period for each function by referring to an interaction history DB (10a) storing an interaction history for each user including information representing a function corresponding to the user speech input by one or more users and information representing a time point at which the function was executed; determine a target function on the basis of the first use degree for each function; generate speech examples corresponding to the target function; and determine speech examples to be presented to the user from among the speech examples generated by the speech example generating unit (14).

10 Claims, 9 Drawing Sheets

Fig.3

| USER ID | DATE AND TIME | USER SPEECH | FUNCTION | FUNCTION ID |
|---|---|---|---|---|
| U1 | 20XX/2/23 15:02 | SHOW ME TODAY'S WEATHER | WEATHER | F001 |
| U2 | 20XX/2/23 15:04 | WHAT IS TODAY'S FORTUNE? | FORTUNE TELLING | F003 |
| U3 | 20XX/2/23 15:05 | TO SET ALARM | ALARM | F015 |
| U4 | 20XX/2/23 15:10 | TALK ABOUT INTERESTING THING | CHATTING | F023 |
| ... | ... | ... | ... | ... |

Fig. 4

| SPEECH EXAMPLE ID | SPEECH EXAMPLE | NUMBER OF PRESENTED USER | NUMBER OF CONTINUOUS USE USERS |
|---|---|---|---|
| D1 | SHOW ME TODAY'S WEATHER | 50 | 20 |
| D2 | WHAT IS TODAY'S FORTUNE? | 30 | 10 |
| D3 | TO SET ALARM | 40 | 30 |
| D4 | TALK ABOUT INTERESTING THING | 0 | 0 |
| ... | ... | ... | ... |

Fig. 7

| SPEECH EXAMPLE GROUP | EG1 | EG2 | EG3 |
|---|---|---|---|
| WEIGHTING FACTOR (RATIO OF USER NUMBERS) | 7 | 2 | 1 |
| USER GROUP | UG1 | UG2 | UG3 |
| FIRST SPEECH EXAMPLE | SETTING OF ALARM | SETTING OF ALARM | SETTING OF ALARM |
| SECOND SPEECH EXAMPLE | WHAT IS TODAY'S FORTUNE? | WHAT IS TODAY'S FORTUNE? | WHAT IS TODAY'S FORTUNE? |
| THIRD SPEECH EXAMPLE | WORD GAME | I WANT TO REGISTER TOMORROW'S PLAN | WORD GAME |
| FOURTH SPEECH EXAMPLE | SHOW ME DATA USE AMOUNT | SHOW ME WEATHER | I WANT TO REGISTER TOMORROW'S PLAN |

Fig.8

| SPEECH EXAMPLE ID | SPEECH EXAMPLE | USER ID | NUMBER OF USE DAYS | USE PERIOD |
|---|---|---|---|---|
| D1 | SHOW ME TODAY'S WEATHER | U1 | 3 | 20 |
| D1 | SHOW ME TODAY'S WEATHER | U2 | 2 | 10 |
| D1 | SHOW ME TODAY'S WEATHER | U3 | 0 | 0 |
| D2 | WHAT IS TODAY'S FORTUNE? | U1 | 1 | 1 |
| ... | ... | ... | ... | ... |

INTERACTION ASSISTANCE DEVICE

TECHNICAL FIELD

One aspect of the present invention relates to an interaction assistance device.

BACKGROUND ART

Conventionally, interaction services in which speech input by a user (user speech) is acquired, and a function (task) corresponding to the user speech is executed are known. In addition, in order to encourage use of such an interaction service, a structure for presenting an example of speech to a user is known. For example, Patent Literature 1 discloses a technique for presenting an example of speech corresponding to a function of which the number of uses is smaller than a threshold determined in advance with priority to a user on the basis of a use history of execution of functions using voices.

CITATION LIST

Patent Literature

[Patent Literature 1] Japanese Unexamined Patent Publication No. 2014-134675

SUMMARY OF INVENTION

Technical Problem

According to the technique described above, a chance for executing a function that is not normally used often by a user using an interaction service can be presented to the user. However, there are cases in which such a function is a function of which the number of users is originally small. In such cases, even when an example of speech corresponding to the function is used by a user as a trial, there is a high possibility of the function being used only once at that time and not being continuously used thereafter. Thus, in the technique described above, there is room for improvement from the point of view of encouraging a user to perform continuous use of the interaction service.

Thus, an object of one aspect of the present invention is to provide an interaction assistance device capable of effectively encouraging a user to perform continuous use of an interaction service.

Solution to Problem

An interaction assistance device according to one aspect of the present invention is an interaction assistance device that presents speech examples to a user through a terminal that is able to execute a function corresponding to user speech, the interaction assistance device including: a calculation unit configured to calculate a first use degree representing a degree to which a function is used in accordance with user speech in a first period for each function by referring to a database storing an interaction history for each user including information representing the function corresponding to the user speech input by one or more users and information representing a time point at which the function was executed; a target function determining unit configured to determine a target function on the basis of the first use degree for each function; a speech example generating unit configured to generate speech examples corresponding to the target function; and a speech example determining unit configured to determine speech example to be presented to the user from among the speech examples generated by the speech example generating unit.

According to the interaction assistance device, the first use degree representing a degree of use of a function that is performed by one or more users in the first period is calculated for each function, and a target function that is a target for generating a speech example is determined on the basis of the first use degree. In accordance with this, speech examples corresponding to a function of which a degree of use in the first period is high (in other words, a function that is likely to be re-used repeatedly within a predetermined period) can be generated. By determining speech example to be presented to the user from among the speech examples generated in this way, speech example corresponding to a useful function (a function that is likely to be continuously used) can be presented to the user. As a result, a chance for use of an interaction service using the speech example is given to the user, and continuous use of the interaction service after that can be effectively promoted.

Advantageous Effects of Invention

According to one aspect of the present invention, an interaction assistance device capable of effectively encouraging a user to perform continuous use of an interaction service can be provided.

BRIEF DESCRIPTION OF DRAWINGS

FIG. 3 is a diagram illustrating an example of an interaction history.

FIG. 4 is a diagram illustrating an example of result information.

FIG. 7 is a diagram illustrating an example of speech example groups determined by a speech example determining unit.

FIG. 8 is a diagram illustrating an example of a substituent element of result information.

DESCRIPTION OF EMBODIMENTS

Hereinafter, one embodiment of the present invention will be described in detail with reference to the attached drawings. In description of the drawings, the same reference signs will be assigned to the same elements or elements corresponding to each other, and duplicate description thereof will be omitted.

Figure 1:
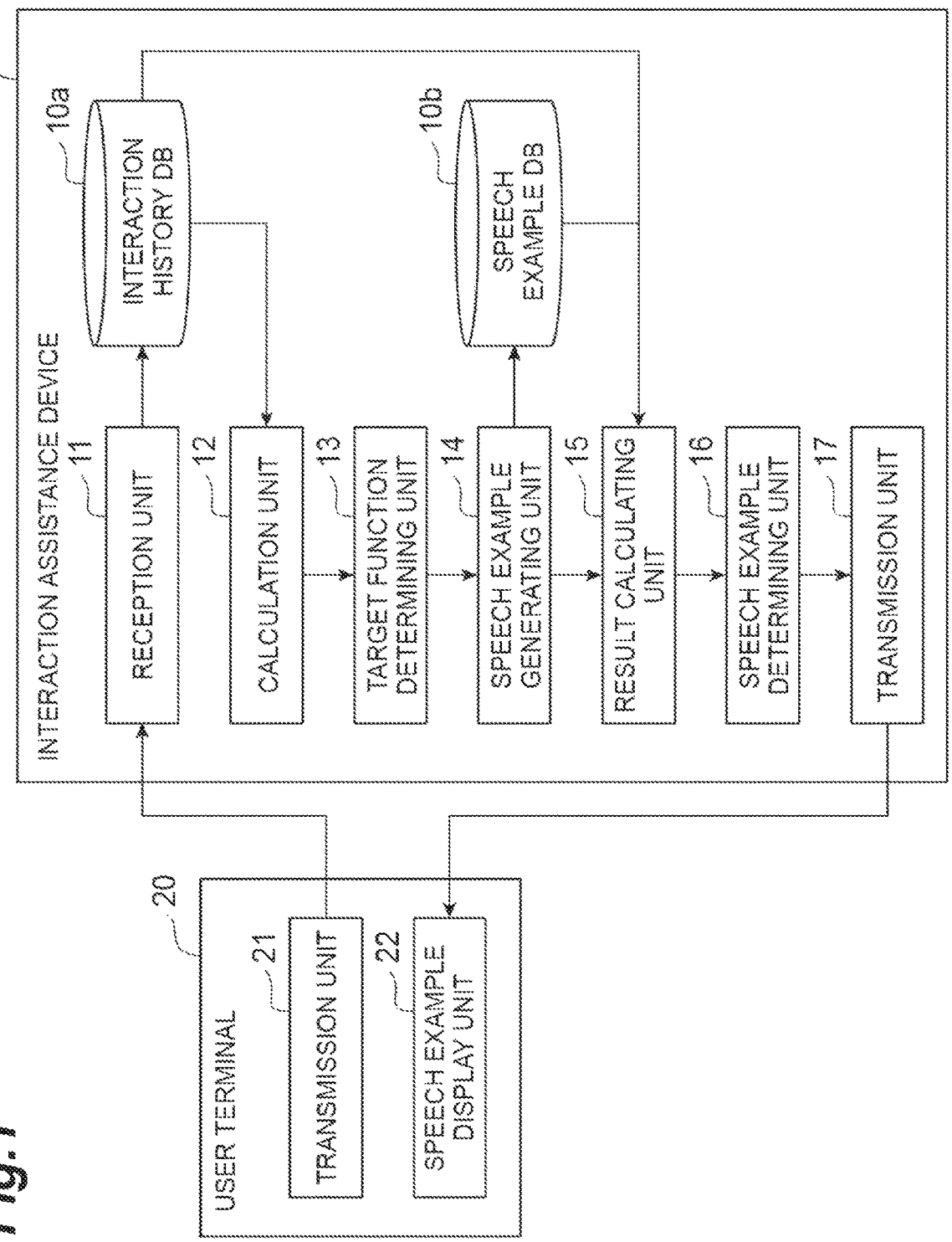
FIG. 1 is a diagram illustrating a functional configuration of an interaction system including an interaction assistance device according to an embodiment.

FIG. 1 is a diagram illustrating a functional configuration of an interaction system 1 including an interaction assistance device 10 according to an embodiment. The interaction system 1 includes the interaction assistance device 10 and a plurality of user terminals 20 used by one or more users (in this embodiment, a plurality of users). The interaction assistance device 10, for example, is a server apparatus configured to be able to communicate with the user terminals 20. The interaction assistance device 10 may be composed of one device or may be composed of a plurality of devices. The user terminal 20, for example, is a computer operated by a user. In this embodiment, as one example, the user and the user terminal 20 have one-to-one correspondence, and the user terminal 20 is a smartphone owned by the user. Here, the form of the user terminal 20 is not limited to a specific form. Other examples of the user terminal 20 include a tablet terminal, a wearable terminal, a personal computer, a smart speaker, a smart TV set, a smart home appliance, and the like. In addition, one user terminal 20 may be shared by a plurality of users.

The user terminal 20 has a function of providing an interaction service to a user. The interaction service is a service for accepting speech input by a user (user speech) and presenting a result of execution of a function (task) corresponding to the user speech to the user. For example, in a case in which user speech "Please show me the way to Tokyo Station" is input by a user, the interaction service presents a path (route) to Tokyo Station to the user by operating a path search application on the basis of an analysis result of the user speech. The user terminal 20 has a known function for executing such an interaction service. For example, the user terminal 20 has a function of receiving user speech, a function of performing an analysis of user speech using a morpheme analysis or the like, a function of calling a function corresponding to the user speech (for example, a function of an application installed in the user terminal 20) in accordance with the analysis result of the user speech, and a function of presenting an execution result of the function to the user.

In addition, the user terminal 20 may not have all the functions described above. For example, some of the functions (for example, a function of analyzing user speech) may be executed by a first device different from the user terminal 20 and configured to be able to communicate with the user terminal 20. In such a case, for example, the user terminal 20 may transmit the user speech to the first device and receive an analysis result acquired by the first device from the first device. In addition, a function identified in accordance with the analysis result (the function corresponding to the user speech) may not necessarily be executed on the user terminal 20 and may be executed on a second device different from the user terminal 20 configured to be able to communicate with the user terminal 20. In such a case, for example, the user terminal 20 may acquire a result of execution of the function corresponding to the user speech from the second device and present the result of execution to the user. In addition, the first device and the second device may be the same device or may be devices different from each other. In addition, the interaction assistance device 10 may function as some or all of the first device and/or the second device described above.

Figure 2:
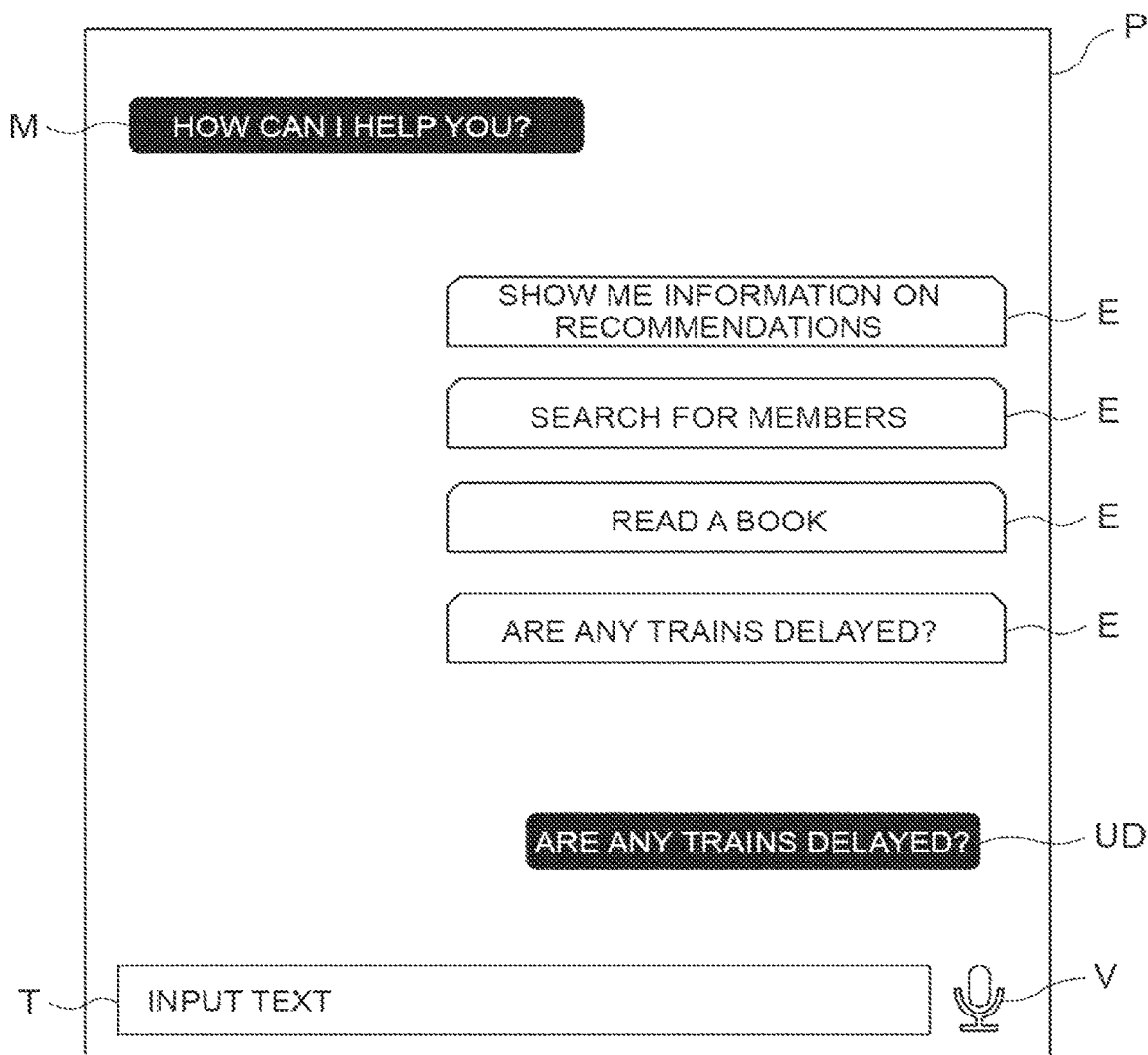
FIG. 2 is a diagram illustrating an example of a reception screen presented to a user on a user terminal.

FIG. 2 is a diagram illustrating an example of a reception screen presented to a user through the user terminal 20 in the interaction service described above. For example, in accordance with selection of an icon corresponding to the interaction service among a plurality of icons on a menu screen displayed on a display of the user terminal 20 in accordance with a user's touch operation or the like, the reception screen P is operated. As illustrated in FIG. 2, on the reception screen P, one or more (here, four as one example) speech examples E are displayed together with a system message M "How can I help you?." In the example illustrated in FIG. 2, speech examples E of "Show me information on recommendations," "Search for members," "Read a book," and "Are any trains delayed?" are presented to the user.

Thereafter, the user inputs user speech. For example, by inputting text to a text input window T disposed in a lower part of the reception screen P, a user may input user speech in the form of text data. Alternatively, by operating a voice accepting function by selecting a voice input icon V disposed on a right side of the text input window T and performing voice input using the voice accepting function, a user may input user speech in the form of voice data. In this way, a method for acquiring user speech in the user terminal 20 is not particularly limited. In other words, the user terminal 20, for example, may acquire user speech (text data) input using a character string or may acquire user speech (voice data) input using a voice.

The reception screen P illustrated in FIG. 2 represents a state immediately after user speech UD "Are any trains delayed?" is input by a user using a series of the processes described above. In other words, a case in which "Are any trains delayed?" that is one of the speech examples E presented to the reception screen P is used (employed) by a user is illustrated. Thereafter, the user speech UD is analyzed, and a function corresponding to the user speech UD is provided for the user. In this way, by presenting an appropriate speech example E to a user, the user can be prompted to use the interaction service. The interaction system 1 has a structure for effectively prompting a user to perform continuous use of the interaction service by appropriately determining speech examples presented to the user. Here, each function included in the interaction system 1 for realizing such a structure will be described.

The user terminal 20 includes a transmission unit 21 and a speech example display unit 22. The transmission unit 21 transmits an interaction history representing a user's history of use of an interaction service to the interaction assistance device 10. The interaction history is history information for each user that includes information representing a function corresponding to user speech and information representing a time point at which the function is executed.

FIG. 3 is information representing an example of interaction histories received by the interaction assistance device 10 from a plurality of user terminals 20 (user terminals 20 held by four users (users whose user IDs are U1, U2, U3, and U4) in the example illustrated in FIG. 3). One record (one row) of a table illustrated in FIG. 3 corresponds to one interaction history (an interaction history corresponding to one use of an interaction service). In the example illustrated in FIG. 3, an interaction history includes "user ID," "date and time," "user speech," "function," and "function ID." "User ID" is identification information used for uniquely identifying a user who has used the interaction service. "User ID," for example, can be identified on the basis of account information and the like of a user stored in the user terminal 20. "Date and time" is information representing a time point at which a function corresponding to user speech is executed. In addition, time stringency is not particularly required for the time point at which a function corresponding to user speech is executed. For example, the time point at which a function corresponding to user speech is executed may be a time point at which the user speech is input (a start time point of a process for executing a function corresponding to the user speech) or may be a time point at which a result of execution of the function corresponding to the user speech is presented to the user (an end time point of the process described above). "User speech" is information representing details of user speech input by a user. "Function" is information representing a name (for example, a name of an application or the like registered in advance) of a function corresponding to the user speech. "Function ID" is identification information used for uniquely identifying the function.

The speech example display unit 22 has a function of presenting a speech example to a user. In this embodiment, as illustrated in FIG. 2, the speech example display unit 22 displays speech examples Eon a reception screen P immediately after start of an operation (a screen of a state in which waiting for an input from a user is performed). These speech examples E are transmitted from the interaction assistance device 10 to the user terminal 20. In other words, the speech example display unit 22 displays speech examples E received from the interaction assistance device 10.

The interaction assistance device 10 includes a reception unit 11, a calculation unit 12, a target function determining unit 13, a speech example generating unit 14, a result calculating unit 15, a speech example determining unit 16, a transmission unit 17, an interaction history DB 10*a*, and a speech example DB 10*b*.

The reception unit 11 receives an interaction history (see FIG. 3) from each user terminal 20. For example, by regularly receiving an interaction history from each user terminal 20, the reception unit 11 regularly collects interaction histories accumulated in each user terminal 20. The interaction history received by the reception unit 11 is stored in the interaction history DB 10*a*. The interaction history DB 10*a* is a database that accumulates interaction histories.

The calculation unit 12 calculates a first use degree representing a degree of use of a function in accordance with user speech in a first period determined in advance for each function by referring to the interaction history DB 10*a*. The first period can be arbitrarily determined by an operator of the interaction assistance device 10 or the like. Although a length of the first period is not limited, the first period, for example, is a period having a length of one month or the like. In addition, the first use degree for each function has a value based on the number of users who have used this function a plurality of times at use intervals within a second period in a first period (hereinafter referred to as "re-use users"). The second period can be arbitrarily determined by an operator or the interaction assistance device 10 or the like. As one example, the second period is a period shorter than the first period (for example, one week). In addition, as one example, the first use degree for each function is a ratio (hereinafter referred to as a "re-use ratio") of the number of re-use users to the number of users who have used this function once or more in the first period (hereinafter referred to as "use users").

For example, the calculation unit 12 can calculate a re-use ratio as below. First, by referring to the interaction history DB 10*a*, the calculation unit 12 extracts interaction histories of the first period (in other words, a use history relating to an interaction service used in the first period). In this embodiment, interaction histories of which "date and time" is included in the first period are extracted as interaction histories of the first period. On the basis of the interaction histories extracted as described above, the calculation unit 12 collects the number "N1" of use users who have used the function once or more in the first period and the number "N2" of re-use users matching the definition described above among the use users for each function. Next, the calculation unit 12 calculates a re-use ratio "N2/N1" on the basis of results of the collection. A function of which a re-use ratio calculated in this way is high can be regarded to be a function that strongly tends to be continuously repeatedly used instead of being occasionally used once.

The target function determining unit 13 determines a target function on the basis of a re-use ratio for each function that is calculated by the calculation unit 12. The target function is a function that is a target for generating (preparing) a speech example. For example, the target function determining unit 13 determines functions of a predetermined number (for example, 10 high-ranked functions or the like) as target functions by prioritizing functions of which re-use ratios are highly ranked. Here, a method for determining target functions is not limited to the method described above. For example, the target function determining unit 13 may determine functions of which re-use ratios are equal to or higher than a threshold determined in advance as target functions. In addition, the target function determining unit 13 may exclude functions that are repeatedly used only by a small number of specific users from target functions. For example, the target function determining unit 13 may exclude functions of which the numbers "N1" of use users are smaller than a threshold determined in advance from candidates for target functions even if re-use ratios of the functions are high.

For each of the target functions determined by the target function determining unit 13, the speech example generating unit 14 generates a speech example corresponding to the target function. A speech example corresponding to a target function is a speech example that is able to call the target function. F or example, in a case in which a function "map search" is determined as a target function by the target function determining unit 13, the speech example generating unit 14 generates a speech example that is able to call the function "map search" such as "Show a map of this area." For example, by presenting a list of target functions to an operator of the interaction assistance device 10 and receiving an input (new registration) of a speech example corresponding to each target function, the speech example generating unit 14 may generate (acquire) a speech example corresponding to the target function. Alternatively, by extracting a speech example from among "user speech" included in interaction histories stored in the interaction history DB 10*a* (in other words, user speech actually used by an arbitrary user), the speech example generating unit 14 may generate a speech example corresponding to a target function. For example, in a case in which a function "Weather" (for example, an application presenting weather forecast information) is determined as one of target functions by the target function determining unit 13, the speech example generating unit 14 may employ user speech "Show me today's weather" included in interaction histories (for example, an interaction history of the first row illustrated in FIG. 3) for the function as a speech example corresponding to the function. The speech example generated by the speech example generating unit 14 is stored in the speech example DB 10*b* together with identification information (a speech example ID) for uniquely identifying the speech example. The speech example DB 10*b* is a database that accumulates speech examples.

The result calculating unit 15 calculates result information for each speech example stored in the speech example DB 10*b*. The result information is information that includes a value based on the number of times a speech example was presented in a third period and a second use degree representing a degree of use of a function corresponding to a speech example in accordance with user speech in the third period. In addition, immediately after a speech example is generated by the speech example generating unit 14, if there is no result of presentation of any speech example to a user (in other words, in a case in which the number of presentations and the second use degree are both 0 in the result information), there is no difference between use results of speech examples, and the speech example determining unit 16 may randomly determine a speech example to be presented to the user.

The third period can be arbitrarily determined by an operator of the interaction assistance device 10 or the like. In this embodiment, as one example, similarly to the first period, the third period is a period separated in units of one month. Generation of a use result of a speech example generated on the basis of the first use degree in the first period is after the first period. Thus, the third period is basically a period after the first period. In addition, in this embodiment, as one example, a value based on the number of times a speech example was presented in the third period is the number of unique users to whom speech examples were presented (hereinafter referred to as a "presented user number") in the third period. In addition, the second use degree for each speech example is the number of users who have used a function at use intervals within a fourth period a plurality of times (hereinafter referred to as "continuous use users") among users who have used the function corresponding to a speech example in accordance with presentation of the speech example. The fourth period can be arbitrarily determined by an operator of the interaction assistance device 10 or the like. As one example, the fourth period is a period shorter than the third period (for example, one week).

For example, the result calculating unit 15 can calculate the presented user number and the continuous use user number as follows. First, by referring to the interaction history DB 10a, the result calculating unit 15 extracts interaction histories of the third period (that is, use histories relating to interaction services used in the third period). In this embodiment, interaction histories of which "date and time" is included in the third period are extracted as interaction histories of the third period. Here, in this embodiment, the interaction assistance device 10 (the speech example determining unit 16 to be described below) determines speech examples presented to each user terminal 20. In other words, the interaction assistance device 10 manages speech examples presented on each user terminal 20. In other words, the interaction assistance device 10 retains a correspondence relation between each user terminal 20 and speech examples presented on each user terminal 20. By referring to the correspondence relation described above, the result calculating unit 15 can acquire speech examples presented to a user in each interaction history of the third period. In accordance with this, for each speech example, the result calculating unit 15 can collect the number of users to which the speech example is presented in the third period. Furthermore, by referring to "function" (in other words, a function executed in accordance with user speech) included in each interaction history, the result calculating unit 15 can determine whether or not a function corresponding to a speech example was used in accordance with presentation of the speech example. Then, by referring to a result of such a determination as well, the result calculating unit 15 can collect the continuous use user number described above.

In addition, in a case in which the interaction assistance device 10 does not retain the correspondence relation described above (in other words, in a case in which the interaction assistance device 10 does not acquire speech examples presented on each user terminal 20), the interaction assistance device 10 may acquire information representing a speech example presented to the user (for example, a speech example ID) in an interaction service corresponding to an interaction history from each user terminal 20 together with the interaction history. In any of the methods described above, for each interaction history, by acquiring a speech example presented in correspondence with the interaction history, the result calculating unit 15 can collect a presented user number and a continuation use user number.

FIG. 4 is a diagram illustrating an example of result information for each speech example calculated by the result calculating unit 15. One record (one row) of a table illustrated in FIG. 4 is result information corresponding to one speech example. In the example illustrated in FIG. 4, the result information includes "speech example ID," "speech example," "presented user number," and "continuous use user number."

Figure 6:
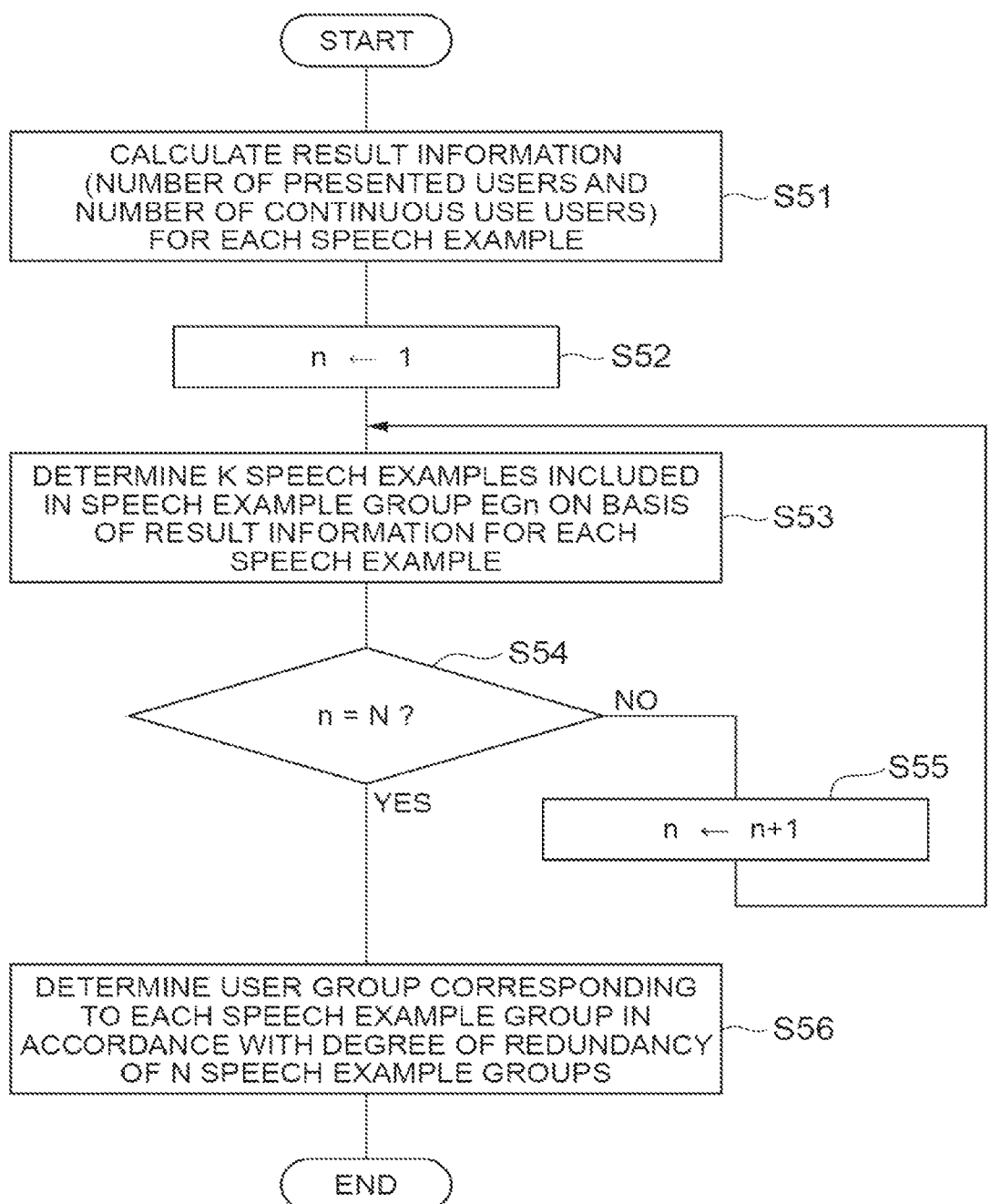
FIG. 6 is a flowchart illustrating an example of a process of Step S5 of the flowchart illustrated in FIG. 5.

The speech example determining unit 16 determines speech examples to be presented to a user from among speech examples generated by the speech example generating unit 14 (that is, speech examples stored in the speech example DB 10b). In this embodiment, the speech example determining unit 16 determines speech examples to be presented to a user on the basis of the result information for each speech example calculated by the result calculating unit 15. Details of the process of the speech example determining unit 16 will be described later with a flowchart illustrated in FIG. 6.

The transmission unit 17 transmits the speech examples determined by the speech example determining unit 16 to each user terminal 20. Details of the process of the transmission unit 17 will be also described later together with the process of the speech example determining unit 16.

Figure 5:
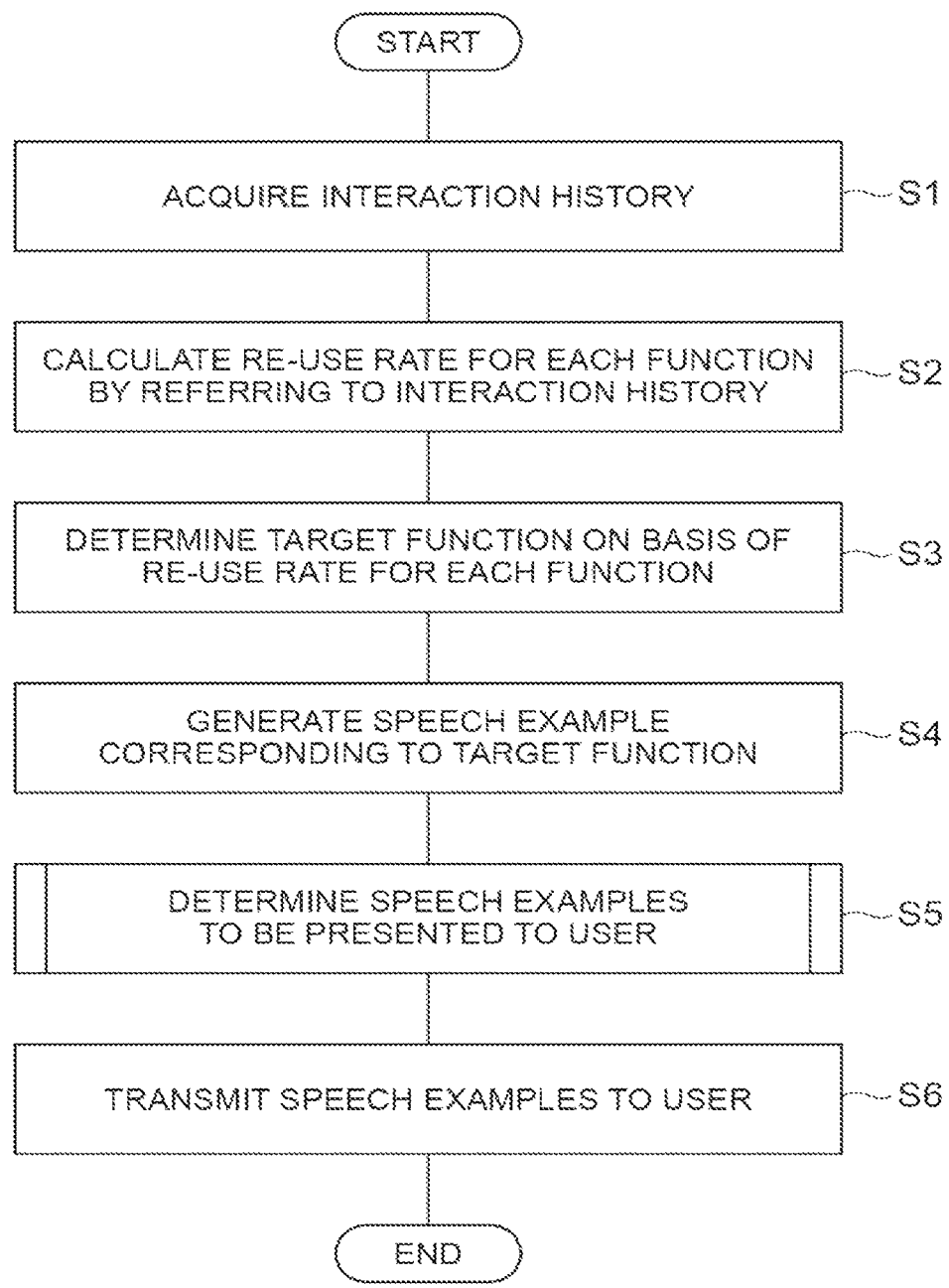
FIG. 5 is a flowchart illustrating an example of an operation of an interaction assistance device.

Next, one example of the operation of the interaction assistance device 10 will be described with reference to a flowchart illustrated in FIG. 5.

In Step S1, the reception unit 11 acquires an interaction history from each user terminal 20. The interaction history of each user terminal 20 acquired by the reception unit 11 is accumulated in the interaction history DB 10a (see FIG. 3).

In Step S2, by referring to the interaction history DB 10a, the calculation unit 12 calculates the re-use ratio (the first use degree) described above for each function.

In Step S3, the target function determining unit 13 determines target functions on the basis of the re-use ratio calculated for each function. As an example, the target function determining unit 13 determines functions corresponding to a number determined in advance (for example, 10 high ranked functions or the like) as target functions by prioritizing functions of which re-use ratio is highly ranked.

In Step S4, the speech example generating unit 14 generates a speech example corresponding to each target function determined by the target function determining unit 13. The generated speech examples are stored in the speech example DB 10b.

In Step S5, speech examples to be presented to the user from among speech examples stored in the speech example DB 10b are determined using the result calculating unit 15 and the speech example determining unit 16. One example of the process of Step S5 will be described in detail with reference to a flowchart illustrated in FIG. 6. First, in Step S51, the result calculating unit 15 calculates the result information described above (the presented user number and the continued use user number) for each speech example (see FIG. 4).

Subsequently, in Steps S52 to S56, the speech example determining unit 16 determines speech examples to be presented to each user (that is, each user terminal 20). In this embodiment, the speech example determining unit 16 divides a plurality of users who are targets to whom speech examples are presented into a plurality of user groups and determines a speech example group including a plurality of (K) speech examples that are presentation candidates for each user group. More specifically, in Steps S52 to S56, the speech example determining unit 16 generates a plurality of (N) speech example groups by repeating the process of determining a speech example group a plurality of times (N times) on the basis of the result information for each speech example. Then, the speech example determining unit 16 determines the number of users included in a user group corresponding to each of speech example groups not overlapping each other in accordance with a degree of overlapping among speech example groups. Hereinafter, processes of Steps S52 to S56 will be described in detail. In this embodiment K is "4," and N is "10."

In Step S52, the speech example determining unit 16 substitutes an initial value "1" into a variable n. Subsequently, in Step S53, the speech example determining unit 16 determines K speech examples included in the n-th speech example group EG (hereinafter denoted as "speech example group $EG_n$") on the basis of the result information for each speech example. As one example, by executing calculation using bandit algorithm based on the result information for each speech example, the speech example determining unit 16 determines speech examples to be presented to a user.

More specifically, first, by executing calculation based on the bandit algorithm, the speech example determining unit 16 determines one speech example from a set G including all the speech examples stored in the speech example DB 10b. The bandit algorithm is a technique for selecting an option by controlling a ratio between utilization (selection of an option for maximizing an advantage from information that is currently known) and a search (selecting an option for obtaining information other than the information that is currently known). Examples of such a bandit algorithm include various known algorithms such as an E greedy method, a Thomson sampling method, and the like. The bandit algorithm used by the speech example determining unit 16 may be an algorithm for selecting an option by controlling utilization and a search described above and is not limited to a specific algorithm.

For example, the speech example determining unit 16 calculates a continuous use rate "continuous use user number/presented user number" on the basis of the result information (the presented user number and the continuous use user number). Then, the speech example determining unit 16, in a scene in which "utilization" described above is performed, selects speech examples of which represented user numbers are large and continuous use rates are high (in other words, speech examples of which effects of presentation of the speech examples are high in the information that is currently known) with priority and, in a scene in which "search" described above is performed, randomly selects speech examples regardless of continuous use rates or selects speech examples of which the numbers of times of trials (presented user numbers) are small with priority.

For example, in a case in which the E greedy method described above is used, the speech example determining unit 16 performs "search" with a probability ε (0<ε<1) and performs "utilization" with a probability 1−ε, thereby selecting a speech example. In accordance with this, a first speech example included in the speech example group $EG_n$ is selected. Subsequently, the speech example determining unit 16 excludes the speech example (the first speech example) that has been selected from the set G through the calculation described above and then performs the calculation described above again for this set G, thereby selecting a second speech example included in the speech example group $EG_n$. By repeating such a process (the process of selecting a speech example one each time from the set G from which the selected speech example has been excluded) K times, K speech examples included in the speech example group $EG_n$ can be selected. In this way, the speech example group $EG_n$ (that is, K speech examples configuring the speech example group $EG_n$) is determined.

By repeating the process of Step S53 described above N times, the speech example determining unit 16 generates N speech example groups $EG_1$ to $EG_N$. In other words, after the process of Step S53 is completed, the speech example determining unit 16 determines whether or not "n=N" (step S54). In a case in which "n=N" is not satisfied (Step S54: No), the speech example determining unit 16 increments the variable n (Step S55) and performs the process of Step S53 again. In a case in which "n=N" is satisfied (Step S54: Yes), the speech example determining unit 16 proceeds to the process of Step S56.

In Step S56, the speech example determining unit 16 determines whether or not there are speech example groups overlapping each other among N speech example groups $EG_1$ to $EG_N$. In other words, the speech example determining unit 16 determines whether or not there are a plurality of speech example groups in which sets of speech examples included in the speech example groups are the same. Then, in a case in which there are a plurality of speech example groups overlapping each other, the speech example determining unit 16 integrates such speech example groups into one new speech example group and sets the number of the speech example groups used as integration targets as a weighting factor of the new speech example group. For example, in a case in which seven speech example groups $EG_1$, $EG_3$, $EG_4$, $EG_5$, $EG_6$, $EG_8$, and $EG_{10}$ include sets of the same speech examples, such speech example groups are integrated into one new speech example group (hereinafter referred to as "speech example group EG1"). "7" that is the number of the speech example groups used as integration targets is set in the speech example group EG1 as a weighting factor. In addition, in a case in which the speech example groups $EG_2$ and $EG_7$ include sets of the same speech examples, such speech example groups are integrated into new one speech example group (hereinafter referred to as "speech example group EG2"). Then, "2" that is the number of the speech example groups used as integration targets is set in the speech example group $EG_2$ as a weighting factor. In a speech example group (here, the speech example group EG3 formed only from the speech example group $EG_9$) not overlapping any other speech example group, "1" is set as a weighing factor. In accordance with the processes described above, speech example groups having sets of speech examples not overlapping each other among the groups are generated. FIG. 7 illustrates an example of unique speech example groups EG1 to EG3 that are finally generated by the process of Step S56.

Here, the speech example determining unit 16 acquires all the users using an interaction service in advance. For example, the speech example determining unit 16 may acquire registration information of users using an interaction service in advance. Then, the speech example determining unit 16 distributes all the users described above to a plurality of (here, three) speech example groups EG1 to EG3. In other words, the speech example determining unit 16 distributes all the users described above to a user group UG1 to which the speech example group EG1 is applied, a user group UG2 to which the speech example group EG2 is applied, and a user group UG3 to which the speech example group EG3 is applied. In this embodiment, the speech example determining unit 16 determines the number of users included in a user group corresponding to each of speech example groups not overlapping each other in accordance with a degree of overlapping (weighting factor) among the speech example groups $EG_1$ to $EG_{10}$. More specifically, the speech example determining unit 16 distributes users to the speech example groups EG1 to EG3 such that ratios of the numbers of users distributed to the speech example groups EG1 to EG3 coincide with ratios of the weighting factors of the speech example groups EG1 to EG3. In accordance with this, distribution of users can be performed with a speech example group that is regarded to be more effective for maximizing the effect of presentation of speech examples (a speech example group derived more in generation (the process of Step S53) of a speech example group using the bandit algorithm described above) regarded as important. In addition, by distributing users to a plurality of speech example groups different from each other, a variation of speech examples presented to a user is secured, and "search" described above can be effectively performed.

In accordance with the processes (Steps S51 to S56) described above, speech examples (here, a speech example group including four speech examples) presented to each user (each user terminal 20) are determined.

In Step S6, the transmission unit 17 transmits speech examples determined by the speech example determining unit 16 to each user terminal 20. More specifically, the transmission unit 17 transmits information of the speech example group EG1 to user terminals 20 of users belonging to the user group UG1, transmits information of the speech example group EG2 to user terminals 20 of users belonging to the user group UG2, and transmits information of the speech example group EG3 to user terminals 20 of users belonging to the user group UG3. As a result, in the user terminals 20 of the users belonging to the user groups UG1 to UG3, four speech examples included in each of the speech example groups EG1 to EG3 are displayed on the reception screen P (see FIG. 2) of the interaction service.

According to the interaction assistance device 10 described above, the first use degree representing a degree of use of a function that is performed by one or more users in the first period is calculated for each function, and a target function that is a target for generating speech examples is determined on the basis of the first use degree. In accordance with this, speech examples corresponding to a function of which a degree of use in the first period is high (in other words, a function that is likely to be repeatedly re-used within a predetermined period) can be generated. By determining speech example to be presented to a user among the speech examples generated in this way, speech example corresponding to a useful function (a function that is likely to be continuously used) can be presented to the user. As a result, a chance for use of an interaction service using the speech example can be given to a user, and continuous use of the interaction service thereafter can be effectively promoted. In other words, according to the configuration described above, in a case in which the number of functions that can be executed through an interaction service is very large, a function of which usefulness cannot be expected (in other words, a function that is not likely to be continuously used) can be excluded from a target for generating speech examples in advance. As a result, speech examples can be presented focusing on functions that are likely to be continuously used by users.

In addition, the first use degree is a value based on the number of re-use users who have used the function a plurality of times at use intervals within the second period among use users who have used the function once or more in the first period (in this embodiment, as one example, a re-use rate (=the number of re-use users/the number of use users)). According to the configuration described above, it is possible to determine a function that is likely to be continuously and repeatedly used instead of being occasionally used once as a target function.

In addition, the speech example determining unit 16 determines speech examples to be presented to a user on the basis of the result information (see FIG. 4) for each speech example calculated by the result calculating unit 15. According to the configuration described above, speech examples to be presented to a user can be selected with effects that are actually acquired by presenting speech examples taken into account. More specifically, in this embodiment, the interaction assistance device 10 executes a first phase and a second phase. A first phase is a phase in which a function (target function) that is a target for generating speech examples is determined on the basis of the first use degree, speech examples corresponding to this target function are generated, and these speech examples are presented to the user. A second phase is a phase in which speech examples to be presented to the user are determined on the basis of the result information described above. By executing the second phase, the interaction assistance device 10 can optimize speech examples to be presented to a user in accordance with use statuses of actual speech examples. In addition, by executing the first phase before the second phase, for a function that is initially determined that the usefulness thereof cannot be expected, speech examples are set in advance not to be presented to a user. As a result, the second phase can be efficiently executed. In other words, in accordance with the second phase, a period until speech examples presented to a user are optimized can be shortened, or a decrease in a withdrawal rate in the middle of optimization can be reduced.

In addition, the second use degree is a value (in this embodiment, the number of continuous use users as one example) based on the number of continuous use users who have used the function a plurality of times at use intervals within the fourth period among users who have used the function corresponding to the speech example in accordance with presentation of speech examples. In other words, in this embodiment, not the number of users who have used a function corresponding to a speech example occasionally once when the speech example is presented but the number of users (continuous use users) who used a function corresponding to a speech example when the speech example is presented and have continuously used the function also after is used as the second use degree. According to the configuration described above, for each speech example, an index that appropriately expresses a presentation effect from a point of view of prompting a user to perform continuous use can be used as the second use degree. As a result, speech examples of which the presentation effects described above are high can be determined as speech examples to be presented to the user.

In addition, by executing calculation using the bandit algorithm based on result information for each speech example, the speech example determining unit 16 determines speech examples to be presented to the user. According to the configuration described above, by executing both the utilization and the search described above, a presentation effect of speech examples can be maximized while a change in the trend of the users (a change of a function that is continuously used by the users or the like) is flexibility responded.

In addition, the speech example determining unit 16 divides a plurality of users who are targets for presenting speech examples into a plurality of user groups and determines a speech example group including a plurality of speech examples that are candidates for presentation for each user group (See FIG. 7). According to the configuration described above, compared to a case in which common speech examples (a speech example group) are presented to all the users, a variation of speech examples presented to the user can be increased. As a result, an effect of presentation of more speech examples can be efficiently checked, and a change in the trend of the users can be responded more flexibly.

In addition, in the embodiment described above, the result calculating unit 15 may calculate an index other than the number of continuous use users as the second use degree. For example, the second use degree may be a value based on the number of days on which the function was used in the third period for each user. As one example, the result calculating unit 15 may collect the number of days on which the function is used in the third period for each speech example (function) and for each user. An example illustrated in FIG. 8 represents that a function (weather) corresponding to a speech example "Show me today's weather" having a speech example ID of "D1" was used by a user of a user ID "U1" three days, was used by a user of a user ID "U2" two days, and has not been used by a user of the user ID "U3." In addition, the example illustrated in FIG. 8 represents that a function (fortune telling) corresponding to a speech example of "What is today's fortune?" of the speech example ID "ID2" was used by the user of the user ID "U1" one day. The number of such use days can be used as an index representing a degree to which a corresponding function is continuously used by the user in the third period. Thus, the result calculating unit 15 may calculate a collected value of the number of use days of each user (for example, a sum value, a mean value, or the like) as the second use degree in place of the number of continuous use users.

In addition, the second use degree may be a value based on a period from a time point (for example, a date) at which the function was used first to a time point (for example, a date) at which the function was used last in the third period for each user. For example, the result calculating unit 15 may identify, for each speech example (function) and each user, a time point (a first use date) at which the function was used first and a time point (a last use date) at which the function was used last in the third period. Then, the result calculating unit 15 may calculate "the last use date−the first use date+1" as a use period in which the user has used the function within the third period. The example illustrated in FIG. 8 represents that, for a function (weather) corresponding to the speech example "Show me today's weather" of the speech example ID "D1," a use period of the user of the user ID "U1" is 20 days, a use period of the user of the user ID "U2" is 10 days, and a use period of the user of the user ID "U3" is 0 days. In addition, the example illustrated in FIG. 8 represents that, for a function (fortune telling) corresponding to the speech example "What is today's fortune?" of the speech example ID "ID2," a use period of the user of the user ID "U1" is one day. Such a use period may be an index representing a degree to which the function is continuously used by the user in the third period. Thus, the result calculating unit 15 may calculate a collected value (for example, a sum value, a mean value, or the like) of use periods of users as the second use degree in place of the number of continuous use users.

In addition, the result calculating unit 15 may calculate a plurality of indexes among the number of continuous use users, the number of use days, and the use period described above as the second use degree. Then, the speech example determining unit 16 may determine speech examples to be presented to the user using such a plurality of indexes.

In addition, also for the first use degree, an index similar to the second use degree described above can be used. In other words, the calculation unit 12 may calculate an index other than the re-use rate as the first use degree. For example, the first use degree may be a value based on the number of days on which the function was used in the first period for each user. This value is a value similar to "the value based on the number of days on which the function was used in the third period" described above (in other words, a case acquired by rephrasing "third period" in description of "the value based on the number of days on which the function was used in the third period" described above with "first period"). In addition, the first use degree may be a value based on a period from a time point (for example, a date) at which the function was used first to a time point (for example, a date) at which the function was used last in the first period for each user. This value is a value similar to "a value based on a period from a time point (for example, a date) at which the function was used first to a time point (for example, a data) at which the function was used last within the third period for each user" described above (for example, a case acquired by rephrasing "third period" in description of "a value based on a period from a time point (for example, a date) at which the function was used first to a time point (for example, a date) at which the function was used last within the third period for each user" described above with "first period").

In addition, the result calculating unit 15 may calculate result information for each attribute of a user. For example, the interaction assistance device 10 may store an attribute of a user in association with a user ID. In such a case, by referring to the interaction history DB 10*a* and an attribute of a user associated with a user ID, the result calculating unit 15 can calculate the result information described above for each speech example and each attribute of the user. For example, user attributes are attributes that are associated with a user such as a gender, an age, a hobby/taste, a health state, and the like. For example, in a case in which a gender and an age are used as user attributes, the result calculating unit 15 can calculate the result information described above for each category (for example, a man in his 30s, a woman in her 20s, or the like) identified using a combination of the gender and the age. Then, the speech example determining unit 16 may determine speech examples to be presented to a user for each attribute of the user on the basis of result information calculated for each attribute of the user. In other words, Step S5 (the flowchart illustrated in FIG. 6) illustrated in FIG. 5 may be executed for each category corresponding to an attribute of the user. According to the configuration described above, speech examples appropriate for each category can be presented on the basis of a trend for each category.

In addition, the result calculating unit 15 may be omitted. In such a case, the speech example determining unit 16 may determine speech examples to be presented to a user without using the result information. For example, the speech example determining unit 16 may determine all the speech examples generated by the speech example generating unit 14 as speech examples to be presented to the user. Alternatively, the speech example determining unit 16 may randomly select speech examples to be presented to a user from among speech examples generated by the speech example generating unit 14. Since speech examples corresponding to a function (target function) that is likely to be continuously used are generated by the speech example generating unit 14, although the result calculating unit 15 is omitted as described above, by presenting speech examples, a user can be effectively prompted to continuously use the interaction service. As described above, by taking the result information calculated by the result calculating unit 15 into account, while an effect of presentation of actual speech examples is checked, speech examples to be presented to the user can be determined more appropriately.

The block diagrams used in the description of the embodiment show blocks in units of functions. These functional blocks (components) are realized in any combination of at least one of hardware and software. Further, a method of realizing each functional block is not particularly limited. That is, each functional block may be realized using one physically or logically coupled device, or may be realized by connecting two or more physically or logically separated devices directly or indirectly (for example, using a wired scheme, a wireless scheme, or the like) and using such a plurality of devices. The functional block may be realized by combining the one device or the plurality of devices with software.

The functions include judging, deciding, determining, calculating, computing, processing, deriving, investigating, searching, confirming, receiving, transmitting, outputting, accessing, resolving, selecting, choosing, establishing, comparing, assuming, expecting, regarding, broadcasting, notifying, communicating, forwarding, configuring, reconfiguring, allocating, mapping, assigning, or the like, but not limited thereto.

Figure 9:
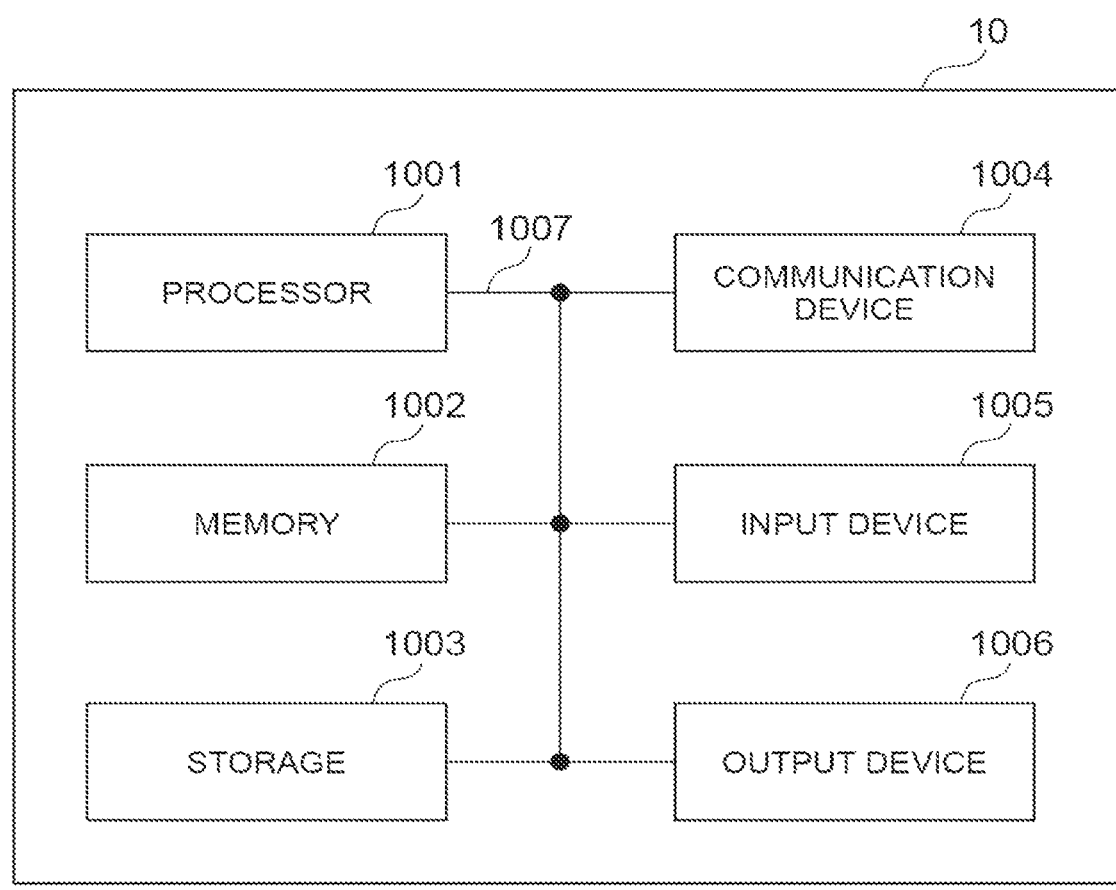
FIG. 9 is a diagram illustrating an example of a hardware configuration of an interaction assistance device.

For example, the interaction assistance device 10 according to an embodiment of the present invention may function as a computer that performs a processing of the present disclosure. FIG. 9 is a diagram illustrating an example of a hardware configuration of the interaction assistance device 10 according to the embodiment of the present disclosure. The interaction assistance device 10 described above may be physically configured as a computer device including a processor 1001, a memory 1002, a storage 1003, a communication device 1004, an input device 1005, an output device 1006, a bus 1007, and the like.

In the following description, the term "device" can be referred to as a circuit, a device, a unit, or the like. The hardware configuration of the interaction assistance device 10 may include one or a plurality of devices illustrated in FIG. 9, or may be configured without including some of the devices.

Each function in the interaction assistance device 10 is realized by loading predetermined software (a program) into hardware such as the processor 1001 or the memory 1002 so that the processor 1001 performs computation to control communication that is performed by the communication device 1004 or control at least one of reading and writing of data in the memory 1002 and the storage 1003.

The processor 1001, for example, operates an operating system to control the entire computer. The processor 1001 may be configured as a central processing unit (CPU) including an interface with peripheral devices, a control device, a computation device, a register, and the like.

Further, the processor 1001 reads a program (program code), a software module, data, or the like from at one of the storage 1003 and the communication device 1004 into the memory 1002 and executes various processes according to the program, the software module, the data, or the like. As the program, a program for causing the computer to execute at least some of the operations described in the above-described embodiment may be used. For example, the speech example determining unit 16 may be realized by a control program that is stored in the memory 1002 and operated on the processor 1001, and other functional blocks may be realized similarly. Although the case in which the various processes described above are executed by one processor 1001 has been described, the processes may be executed simultaneously or sequentially by two or more processors 1001. The processor 1001 may be realized using one or more chips. The program may be transmitted from a network via an electric communication line.

The memory 1002 is a computer-readable recording medium and may be configured of, for example, at least one of a read only memory (ROM), an erasable programmable ROM (EPROM), an electrically erasable programmable ROM (EEPROM), and a random access memory (RAM). The memory 1002 may be referred to as a register, a cache, a main memory (a main storage device), or the like. The memory 1002 can store an executable program (program code), software modules, and the like in order to implement the communication control method according to the embodiment of the present disclosure.

The storage 1003 is a computer-readable recording medium and may also be configured of, for example, at least one of an optical disc such as a compact disc ROM (CD-ROM), a hard disk drive, a flexible disc, a magneto-optical disc (for example, a compact disc, a digital versatile disc, or a Blu-ray (registered trademark) disc), a smart card, a flash memory (for example, a card, a stick, or a key drive), a floppy (registered trademark) disk, a magnetic strip, and the like. The storage 1003 may be referred to as an auxiliary storage device. The storage medium described above may be, for example, a database including at least one of the memory 1002 and the storage 1003, a server, or another appropriate medium.

The communication device 1004 is hardware (a transmission and reception device) for performing communication between computers via at least one of a wired network and a wireless network and is also referred to as a network device, a network controller, a network card, or a communication module, for example.

The input device 1005 is an input device (for example, a keyboard, a mouse, a microphone, a switch, a button, or a sensor) that receives an input from the outside. The output device 1006 is an output device (for example, a display, a speaker, or an LED lamp) that performs output to the outside. The input device 1005 and the output device 1006 may have an integrated configuration (for example, a touch panel).

Further, the respective devices such as the processor 1001 and the memory 1002 are connected by the bus 1007 for information communication. The bus 1007 may be configured using a single bus or may be configured using buses different between the devices.

Further, the interaction assistance device 10 may include hardware such as a microprocessor, a digital signal processor (DSP), an application specific integrated circuit (ASIC), a programmable logic device (PLD), or a field programmable gate array (FPGA), and some or all of the functional blocks may be realized by the hardware. For example, the processor 1001 may be implemented by at least one of these pieces of hardware.

Although the present embodiment has been described in detail above, it is apparent to those skilled in the art that the present embodiment is not limited to the embodiments described in the present disclosure. The present embodiment can be implemented as a modification and change aspect without departing from the spirit and scope of the present invention determined by description of the claims. Accordingly, the description of the present disclosure is intended for the purpose of illustration and does not have any restrictive meaning with respect to the present embodiment.

A process procedure, a sequence, a flowchart, and the like in each aspect/embodiment described in the present disclosure may be in a different order unless inconsistency arises. For example, for the method described in the present disclosure, elements of various steps are presented in an exemplified order, and the elements are not limited to the presented specific order.

Input or output information or the like may be stored in a specific place (for example, a memory) or may be managed in a management table. Information or the like to be input or output can be overwritten, updated, or additionally written. Output information or the like may be deleted. Input information or the like may be transmitted to another device.

A determination may be performed using a value (0 or 1) represented by one bit, may be performed using a Boolean value (true or false), or may be performed through a numerical value comparison (for example, comparison with a predetermined value).

Each aspect/embodiment described in the present disclosure may be used alone, may be used in combination, or may be used by being switched according to the execution. Further, a notification of predetermined information (for example, a notification of "being X") is not limited to be made explicitly, and may be made implicitly (for example, a notification of the predetermined information is not made).

Software should be construed widely so that the software means an instruction, an instruction set, a code, a code segment, a program code, a program, a sub-program, a software module, an application, a software application, a software package, a routine, a sub-routine, an object, an executable file, a thread of execution, a procedure, a function, and the like regardless whether the software is called software, firmware, middleware, microcode, or hardware description language or called another name.

Further, software, instructions, information, and the like may be transmitted and received via a transmission medium. For example, when software is transmitted from a website, a server, or another remote source using wired technology (a coaxial cable, an optical fiber cable, a twisted pair, a digital subscriber line (DSL), or the like) and wireless technology (infrared rays, microwaves, or the like), at least one of the wired technology and the wireless technology is included in a definition of the transmission medium.

The information, signals, and the like described in the present disclosure may be represented using any of various different technologies. For example, data, an instruction, a command, information, a signal, a bit, a symbol, a chip, and the like that can be referred to throughout the above description may be represented by a voltage, a current, an electromagnetic wave, a magnetic field or a magnetic particle, an optical field or a photon, or an arbitrary combination of them.

Further, the information, parameters, and the like described in the present disclosure may be expressed using an absolute value, may be expressed using a relative value from a predetermined value, or may be expressed using another corresponding information.

Names used for the above-described parameters are not limited names in any way. Further, equations or the like using these parameters may be different from those explicitly disclosed in the present disclosure. Since various information elements can be identified by any suitable names, the various names assigned to these various information elements are not limited names in any way.

The description "based on" used in the present disclosure does not mean "based only on" unless otherwise noted. In other words, the description "based on" means both of "based only on" and "based at least on".

Any reference to elements using designations such as "first," "second," or the like used in the present disclosure does not generally limit the quantity or order of those elements. These designations may be used in the present disclosure as a convenient way for distinguishing between two or more elements. Thus, the reference to the first and second elements does not mean that only two elements can be adopted there or that the first element has to precede the second element in some way.

When "include", "including" and transformation of them are used in the present disclosure, these terms are intended to be comprehensive like the term "comprising". Further, the term "or" used in the present disclosure is intended not to be exclusive OR.

In the present disclosure, for example, when articles such as a, an, and the in English are added by translation, the present disclosure may include that nouns following these articles are plural.

In the present disclosure, a sentence "A and B are different" may mean that "A and B are different from each other". The sentence may mean that "each of A and B is different from C". Terms such as "separate", "coupled", and the like may also be interpreted, similar to "different".

REFERENCE SIGNS LIST 10 interaction assistance device
10a interaction history DB
10b speech example DB
11 reception unit
12 calculation unit
13 target function determining unit
14 speech example generating unit
15 result calculating unit
16 speech example determining unit
17 transmission unit
20 user terminal (terminal)

The invention claimed is:

1. An interaction assistance device that presents speech examples to a user through a terminal that is able to execute a function corresponding to user speech, the interaction assistance device comprising:
processing circuitry configured to
calculate a first use degree representing a degree to which a function is used in accordance with user speech in a first period for each function by referring to a database storing an interaction history for each user, received from each respective user terminal via a network, including information representing the function corresponding to the user speech input by one or more users and information representing a time point at which the function was executed;
determine a target function on the basis of the first use degree for each function;
generate speech examples corresponding to the target function;

calculate result information including a value based on a number of times the speech example was presented in a third period for each speech example and a second use degree representing a degree to which the function corresponding to the speech example was used in accordance with the user speech in the third period; and determine a speech example to be presented to the user from among the generated speech examples on the basis of the calculated result information for each speech example.

2. The interaction assistance device according to claim 1, wherein the first use degree includes a value based on a number of users who used the function a plurality of times at use intervals within a second period among users who used the function once or more in the first period.

3. The interaction assistance device according to claim 1, wherein the first use degree includes at least one of a value based on a number of days on which the function was used in the first period for each user and a value based on a period from a time point at which the function was used first to a time point at which the function was used last within the first period for each user.

4. The interaction assistance device according to claim 1, wherein the second use degree includes a value based on the number of users who used the function a plurality of times at use intervals within a fourth period among users who used the function corresponding to the speech example in accordance with presentation of the speech example.

5. The interaction assistance device according to claim 1, wherein the second use degree includes at least one of a value based on the number of days on which the function was used in the third period for each user and a value based on a period from a time point at which the function was used first to a time point at which the function was used last within the third period for each user.

6. The interaction assistance device according to claim 4, wherein processing circuitry is configured to calculate the result information for each attribute of the user, and determine the speech example to be presented to the user for each attribute of the user on the basis of the result information calculated for each attribute of the user.

7. The interaction assistance device according to claim 4, wherein the processing circuitry is configured to determine the speech examples to be presented to the user by executing calculation using a bandit algorithm based on the result information for each speech example.

8. The interaction assistance device according to claim 4, wherein the processing circuitry is configured to divide a plurality of users who are targets for presenting the speech examples into a plurality of user groups and determine a plurality of speech example groups respectively including a plurality of speech examples that are candidates for presentation for each user group.

9. The interaction assistance device according to claim 8, wherein the processing circuitry is configured to generate the plurality of speech example groups by repeating a process of determining the speech example group a plurality of times on the basis of the result information for each of the speech examples and determine the number of users included in the user group corresponding to each of the speech example groups not overlapping each other in accordance with a degree of overlapping between the speech example groups.

10. A method, implemented by processing circuitry of an interaction assistance device that presents speech examples to a user through a terminal that is able to execute a function corresponding to user speech, the method comprising:

calculating a first use degree representing a degree to which a function is used in accordance with user speech in a first period for each function by referring to a database storing an interaction history for each user, received from each respective user terminal via a network, including information representing the function corresponding to the user speech input by one or more users and information representing a time point at which the function was executed;

determining a target function on the basis of the first use degree for each function;

generating speech examples corresponding to the target function;

calculating result information including a value based on a number of times the speech example was presented in a third period for each speech example and a second use degree representing a degree to which the function corresponding to the speech example was used in accordance with the user speech in the third period; and determining a speech example to be presented to the user from among the generated speech examples on the basis of the calculated result information for each speech example.

* * * * *